United States Patent
Fattorini et al.

(10) Patent No.: US 10,548,193 B1
(45) Date of Patent: Jan. 28, 2020

(54) APPLIANCE ILLUMINATION WITH ZERO STANDBY POWER

(71) Applicant: Haier US Appliance Solutions, Inc., Wilmington, DE (US)

(72) Inventors: Andrea Fattorini, Tyngsboro, MA (US); Steven Michael Recio, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/455,930

(22) Filed: Jun. 28, 2019

(51) Int. Cl.
  *H05B 37/00* (2006.01)
  *H05B 41/00* (2006.01)
  *H05B 33/08* (2006.01)
  *H02M 7/12* (2006.01)
  *F24C 7/08* (2006.01)
  *H05B 6/64* (2006.01)

(52) U.S. Cl.
  CPC ......... *H05B 33/0842* (2013.01); *F24C 7/085* (2013.01); *F24C 7/086* (2013.01); *H02M 7/12* (2013.01); *H05B 6/6435* (2013.01); *H05B 33/0815* (2013.01)

(58) Field of Classification Search
  None
  See application file for complete search history.

(56) References Cited

U.S. PATENT DOCUMENTS

| | | | |
|---|---|---|---|
| 8,223,131 | B2 | 7/2012 | Rudolph et al. |
| 2015/0091461 | A1* | 4/2015 | Nakamura ......... H05B 33/0815 |
| | | | 315/200 R |
| 2019/0215923 | A1* | 7/2019 | Shen ......... F21S 4/28 |

FOREIGN PATENT DOCUMENTS

| | | |
|---|---|---|
| CN | 105848369 A | 8/2016 |
| CN | 206865798 U | 1/2018 |
| CN | 108575007 A | 9/2018 |

* cited by examiner

*Primary Examiner* — Anh Q Tran
(74) *Attorney, Agent, or Firm* — Dority & Manning, P.A.

(57) ABSTRACT

An appliance is provided herein. The appliance may include a power supply configured to receive Alternating Current (AC) power and supply Direct Current (DC) power, a driver circuit configured to receive the DC power and illuminate one or more light emitting diodes (LED), and a fade control circuit configured to direct the driver circuit to fade the one or more LEDs from an on-state to an off-state in a fade-out operation. The appliance may further include a first switching device configured to direct the fade circuit to perform a fade-out operation while the first switching device is in a first state, and a second switching device configured to maintain AC power to the power supply during the fade-out operation, and further configured to sever AC power to the power supply upon completion of the fade-out operation.

20 Claims, 6 Drawing Sheets

APPLIANCE ILLUMINATION WITH ZERO STANDBY POWER

FIELD OF THE INVENTION

The present subject matter relates generally to appliances, such as ovens, and more particularly to appliance illumination with zero standby power.

BACKGROUND OF THE INVENTION

Energy efficiency has become a major driving force in appliance innovation. For example, there are several available ratings for appliances that depict an appliance's energy utilization over the course of a typical year. When considering energy efficiency in an appliance, several factors contribute to energy use, including heating devices, pumps, motors, lighting, and other components.

In appliance lighting, an on/off switch may be used to directly control power consumption of the lighting system. However, increasingly desirable and aesthetically pleasing lighting effects, such as fade-in, fade-out, partial illumination, and other lighting effects make it difficult to utilize a single switch to both control advanced functionality and ensure little to no power is expended while lighting is turned off.

It would be useful to provide a system to illuminate portions of appliances that overcome one or more of the above issues. In particular, it would be advantageous to have a system to illuminate portions of appliances with limited or zero standby power use.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an appliance is provided. The appliance may include a power supply configured to receive Alternating Current (AC) power and supply Direct Current (DC) power, a driver circuit configured to receive the DC power and illuminate one or more light emitting diodes (LED), and a fade control circuit configured to direct the driver circuit to fade the one or more LEDs from an on-state to an off-state in a fade-out operation. The appliance may further include a first switching device configured to direct the fade circuit to perform a fade-out operation while the first switching device is in a first state, and a second switching device configured to maintain AC power to the power supply during the fade-out operation, and further configured to sever AC power to the power supply upon completion of the fade-out operation.

In another exemplary aspect of the present disclosure, a method of illuminating a portion of an appliance with zero standby power use by a power supply is provided. The method may include illuminating a portion of the appliance with one or more light emitting diodes (LEDs) using the power supply and a driver circuit, determining that a main switching device has been opened during illuminating a portion of the appliance with one or more LEDs using the power supply and the driver circuit, directing the driver circuit to fade the one or more LEDs from an on-state to an off-state in a fade-out operation when the main switching device has been opened, maintaining a second switching device in a closed position during the fade-out operation, and severing AC power to the power supply upon completion of the fade-out operation with the second switching device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
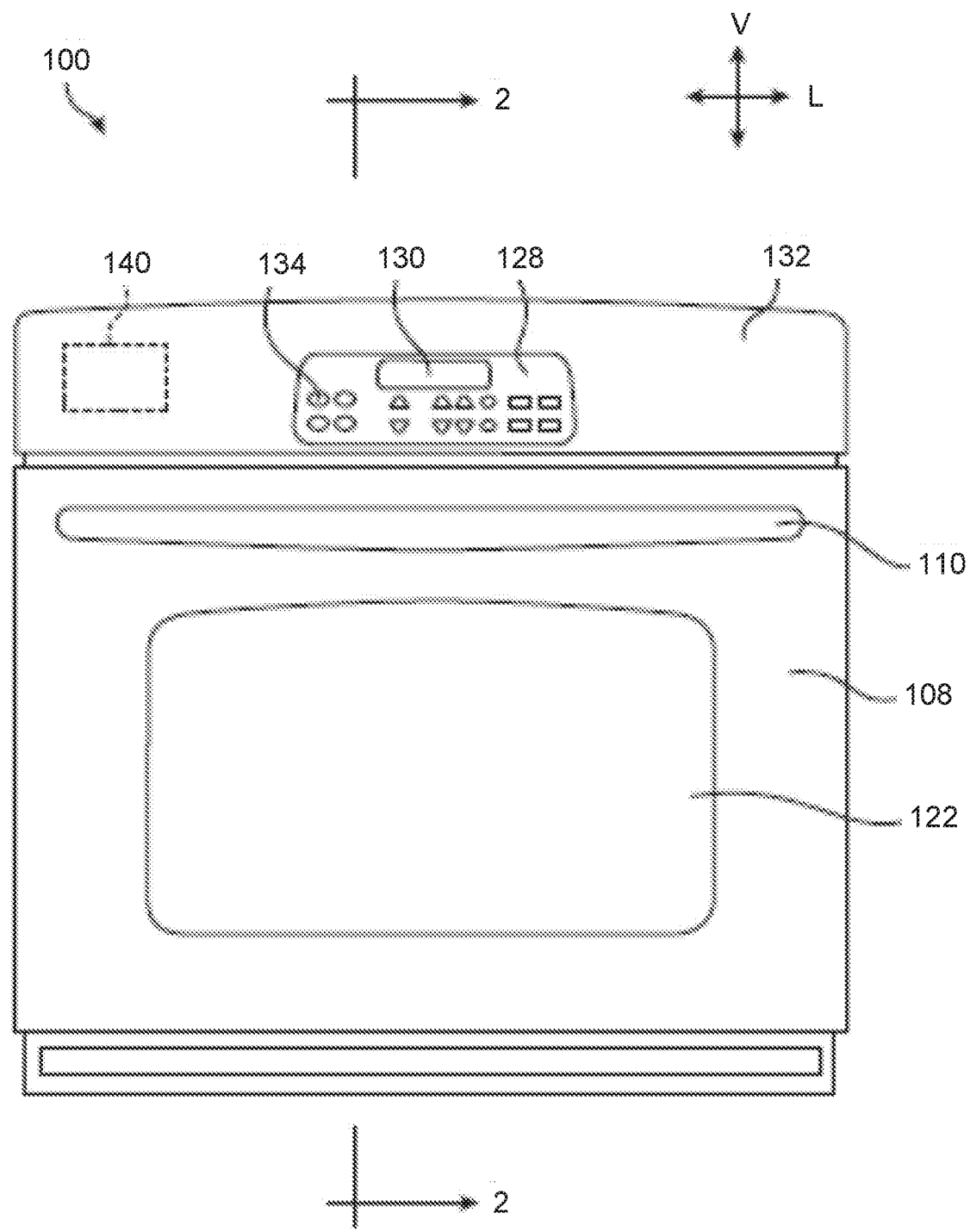
FIG. 1 illustrates a front perspective view of a cooking appliance according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components.

Figure 2:
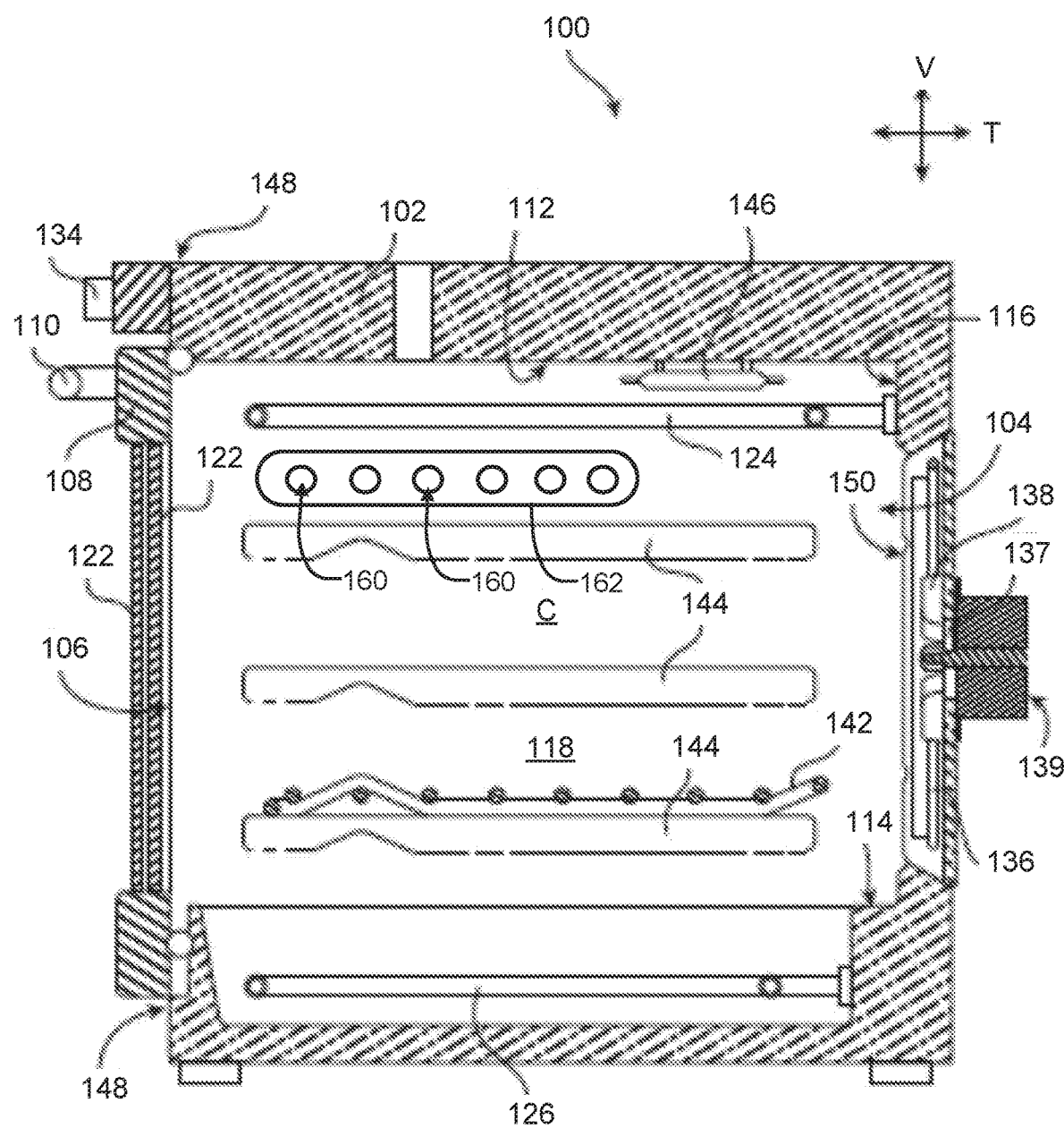
FIG. 2 illustrates a cross-sectional side view of the exemplary oven appliance of FIG. 1 along the line 2-2.

Referring to FIGS. 1 and 2, in example embodiments, a cooking appliance or oven appliance 100 includes an insulated cabinet 102 with an interior cooking chamber 104 defined by a plurality of inner walls (e.g., a top wall 112, a bottom wall 114, a back wall 116, and opposing sidewalls 118, 120). Cooking chamber 104 is configured for the receipt of one or more food items to be cooked. Oven appliance 100 includes a door 108 pivotally mounted, for example, with one or more hinges (not shown), to cabinet 102 at the opening 106 of cabinet 102 to permit selective access to cooking chamber 104 through opening 106. A handle 110 is mounted to door 108 and assists a user with opening and closing door 108. For example, a user can pull on handle 110 to open or close door 108 and access cooking chamber 104.

In some embodiments, a seal (e.g., gasket) is provided between door 108 and cabinet 102 that assists with maintaining heat and cooking fumes within cooking chamber 104 when door 108 is closed, as shown in FIGS. 1 and 2. Multiple parallel glass panes 122 provide for viewing the contents of cooking chamber 104 when door 108 is closed and assist with insulating cooking chamber 104. The glass panes 122 also allow for viewing of the contents of the cooking chamber 104 when said chamber is fully or partially illuminated. A baking rack 142 can be positioned in cooking chamber 104 for the receipt of food items or utensils containing food items. Baking rack 142 is slidably received onto embossed ribs or sliding rails 144 such that rack 142 may be conveniently moved into and out of cooking chamber 104 when door 108 is open.

A heating element at the top, bottom, or both, of cooking chamber 104 provides heat to cooking chamber 104 for cooking. Such heating element(s) can be gas, electric, microwave, or a combination thereof. For example, in the embodiment shown in FIG. 2, oven appliance 100 includes a top heating element 124 and a bottom heating element 126, where bottom heating element 126 is positioned adjacent to and below bottom wall 114. Other configurations with or without wall 114 may be used as well.

In some embodiments, oven appliance 100 includes a convection heating element 136 and convection fan 138 positioned adjacent back wall 116 of cooking chamber 104 (e.g., in fluid communication with cooking chamber 104 through a fan opening 150). Convection fan 138 is powered by a convection fan motor 139. Further, convection fan 138 can be a variable speed fan. Thus, the speed (e.g., rotation speed) of fan 138 may be controlled or set anywhere between and including, for example, 0 and 100 percent. In certain embodiments, oven appliance 100 includes a bidirectional triode thyristor (not shown) [i.e., a triode for alternating current (triac)] to regulate the operation of convection fan 138 such that the speed of fan 138 may be adjusted during operation of oven appliance 100 (e.g., during a preheat or cooking cycle). Optionally, speed of convection fan 138 can be determined by, and communicated to, fan 138 by controller 140. In addition, a sensor 137, such as a rotary encoder, a Hall effect sensor, or the like, may be included at the base of fan 138, for example, between fan 138 and motor 139 as shown in the exemplary embodiment of FIG. 2, to sense the speed of fan 138. The speed of fan 138 may be measured in, for example, revolutions per minute ("RPM").

As shown, oven appliance 100 includes a user interface 128. In some embodiments, user interface 128 has a display 130 positioned on an interface panel 132, as well as a variety of controls 134. Interface 128 allows the user to select various options for the operation of oven 100 including, for example, temperature, time, cooking cycles, cleaning cycles, or illumination. Operation of oven appliance 100 can be regulated by a controller 140 that is operatively coupled (i.e., in communication with) user interface 128, heating elements 124, 126, and other suitable components of oven 100.

In certain embodiments, in response to user manipulation of the user interface 128, controller 140 can operate the heating element(s). Controller 140 can receive measurements from a temperature sensor 146 placed in cooking chamber 104 and, optionally, provide a temperature indication to the user with display 130.

In certain embodiments, in response to user manipulation of a main switching device (not illustrated for clarity), such as a door-limit-switch or a lighting switch, one or more light emitting diodes (LEDs) 160 arranged behind a protective window 162 may be energized to illuminate a portion of the oven 100. For example, the LEDs 160 may fade-in when the main switching device is in a closed position (e.g., such as when the door 108 is opened or if a user selects to turn on lighting). Furthermore, the LEDs 160 may fade-out when the main switching device is in the open position (e.g., such as when the door 108 is closed or a user selects to turn off lighting). Additional details as to the operation of the LEDs 160, fade-in operations, fade-out operations, and standby power use are described more fully below with reference to FIG. 3.

Turning back to FIG. 1, controller 140 includes a memory (e.g., non-transitive media) and one or more processing devices such as microprocessors, CPUs, or the like, such as general or special purpose microprocessors operable to execute programming instructions or micro-control code associated with operation of oven appliance 100. The memory may represent random access memory such as DRAM or read only memory such as ROM or FLASH. In one embodiment, the processor executes programming instructions stored in memory. The memory may be a separate component from the processor or may be included onboard within the processor.

Controller 140 may be positioned in a variety of locations throughout oven appliance 100. In the illustrated embodiment, controller 140 is located next to user interface 128 within interface panel 132. In other embodiments, controller 140 may be located under or next to the user interface 128 otherwise within interface panel 132 or at any other appropriate location with respect to oven appliance 100. In the embodiment illustrated in FIG. 1, input/output ("I/O") signals are routed between controller 140 and various operational components of oven appliance 100 such as heating elements 124, 126, 136, convection fan 138, controls 134, display 130, sensor 146, alarms, or other components as may be provided. In one embodiment, user interface 128 may represent a general purpose I/O ("GPIO") device or functional block.

Although shown with touch type controls 134, it should be understood that controls 134 and the configuration of oven appliance 100 shown in FIG. 1 is provided by way of example only. More specifically, user interface 128 may include various input components, such as one or more of a variety of electrical, mechanical, or electro-mechanical input devices including rotary dials, push buttons, and touch pads. User interface 128 may include other display components, such as a digital or analog display device designed to provide operational feedback to a user. User interface 128 may be in communication with controller 140 via one or more signal lines or shared communication busses.

While oven 100 is shown as a wall oven, the present invention could also be used with other cooking appliances or configurations such as, for example, a double-chamber oven appliance, a stand-alone oven appliance, a combined oven-range appliance, or other configurations of such ovens. Furthermore, although particularly shown as an oven, other appliances may also be suitable. For example, dishwashing appliances, clothes washing appliances, clothes drying appliances, microwave ovens, and other appliances where aesthetically pleasing lighting are desirable may also be suitable. Hereinafter, a detailed description of systems and methods of illuminating an appliance, such as oven 100 or other appliances, with zero standby power use, are described in detail.

Figure 3:
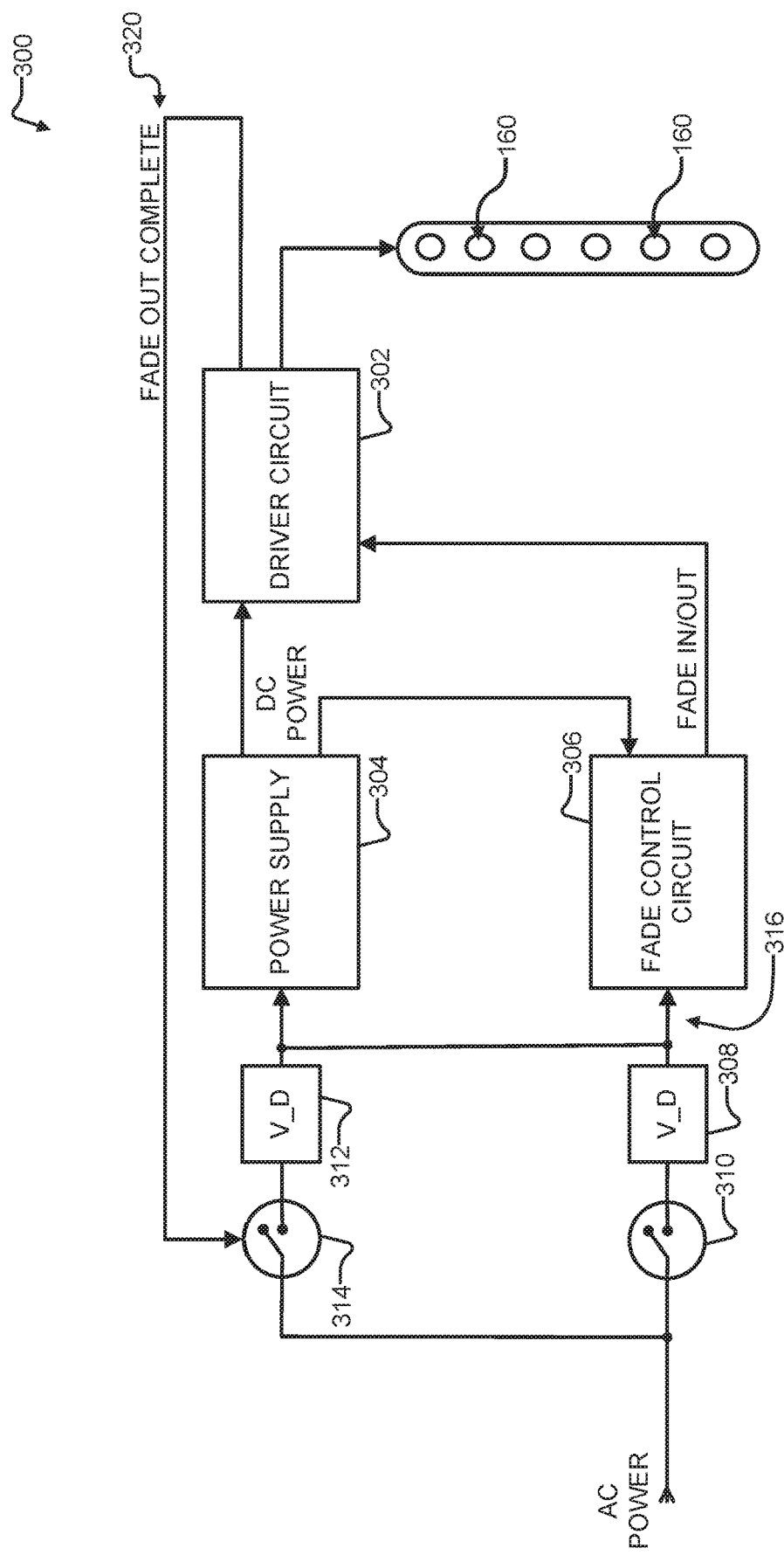
FIG. 3 illustrates a block diagram of a system of illuminating an appliance with zero standby power, according to example embodiments of the present disclosure.

FIG. 3 illustrates a block diagram of a system 300 of illuminating an appliance with zero standby power, according to example embodiments of the present disclosure. It should be noted that many forms of illumination may be appropriate. For example, illuminating an interior cooking chamber 104 of the oven 100, illuminating a portion or entirety of the user interface 128, and/or other forms of illumination may be applicable. As shown in FIG. 3, the system 300 includes one or more LEDs 160 arranged in communication with driver circuit 302.

The LEDs 160 are configured to be energized by the driver circuit 302 and to provide illumination. For example, the driver circuit 302 may receive Direct Current (DC) power from power supply 304. The driver circuit 302 may also receive a fade in/out signal from fade control circuit 306.

Upon receipt of a fade-in signal, the driver circuit 302 may provide a slowly ramping up current to the LEDs 160 such that they illuminate slowly. For example, the fade control circuit 306 may provide a fade in/out signal based on a linearly increasing pulse-width modulated (PWM) waveform that increases from 0%-100% in any desirable time frame. The driver circuit 302 slowly ramps up current based on the PWM fade in/out signal received until LEDs 160 reach a predetermined or desired level of brightness.

Upon receipt of a fade-out signal, the driver circuit 302 may provide a slowly decreasing current to the LEDs 160 such that they diminish illuminating slowly. For example, the fade control circuit 306 may provide a fade in/out signal based on a linearly decreasing PWM waveform that decreases from 100-0% in any desirable timeframe. The driver circuit 302 slowly decreases current based on the PWM fade in/out signal received until LEDs 160 are turned off completely.

As described above, the fade in/out functionality is provided through the power supply 304 providing DC power to the driver circuit 302 and the fade control circuit 306. However, in order to conserve power, example embodiments of this disclosure are configured to sever the AC power, and therefore all power to the power supply 304, upon completion of a fade-out operation, as follows.

When the main switching device 310 is in a first state (e.g., an open state or open position), the system 300 is off. For example, no power is supplied to the power supply 304, and zero standby power is used.

When main switching device 310 is moved to a second state (e.g., a closed position or closed state), AC power flows through voltage dropping components 308 and supplies power to the power supply 304 as well as a "turn on" or "illuminate" signal 316 to the fade control circuit 306. Upon receipt of signal 316, the fade control circuit 306 operates as described above to perform a fade-in operation and maintains the LEDs 160 in a powered-on state.

When main switching device 310 is subsequently moved back to the first state, second switching device 314 supplies AC power to the voltage dropping components 312 and supplies power to the power supply 304. However, the voltage drop across voltage dropping components 312 is greater than the voltage drop across voltage dropping components 308. Thus, signal 316 is absent. Accordingly, the absence of signal 316 causes the fade control circuit 306 to initiate a fade-out operation as described above. Upon completion of the fade-out operation, the driver circuit and associated components provide a fade out complete signal 320 that causes second switching device to be placed in the open position; thereby severing AC power from the power supply 304 and ensuring a zero standby power consumption.

Figure 4:
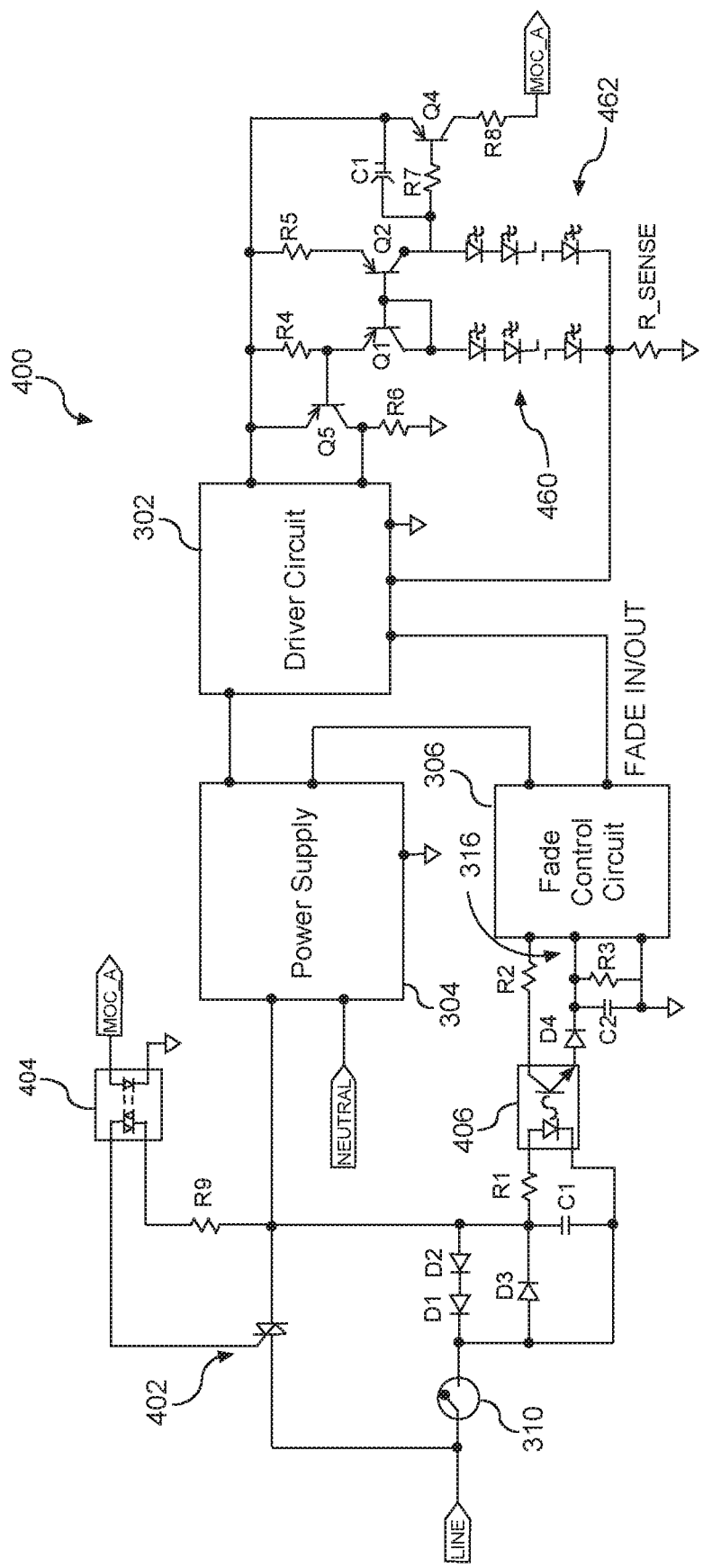
FIG. 4 illustrates a schematic of circuitry for implementing the system of FIG. 3, according to example embodiments of the present disclosure.
Figure 5:
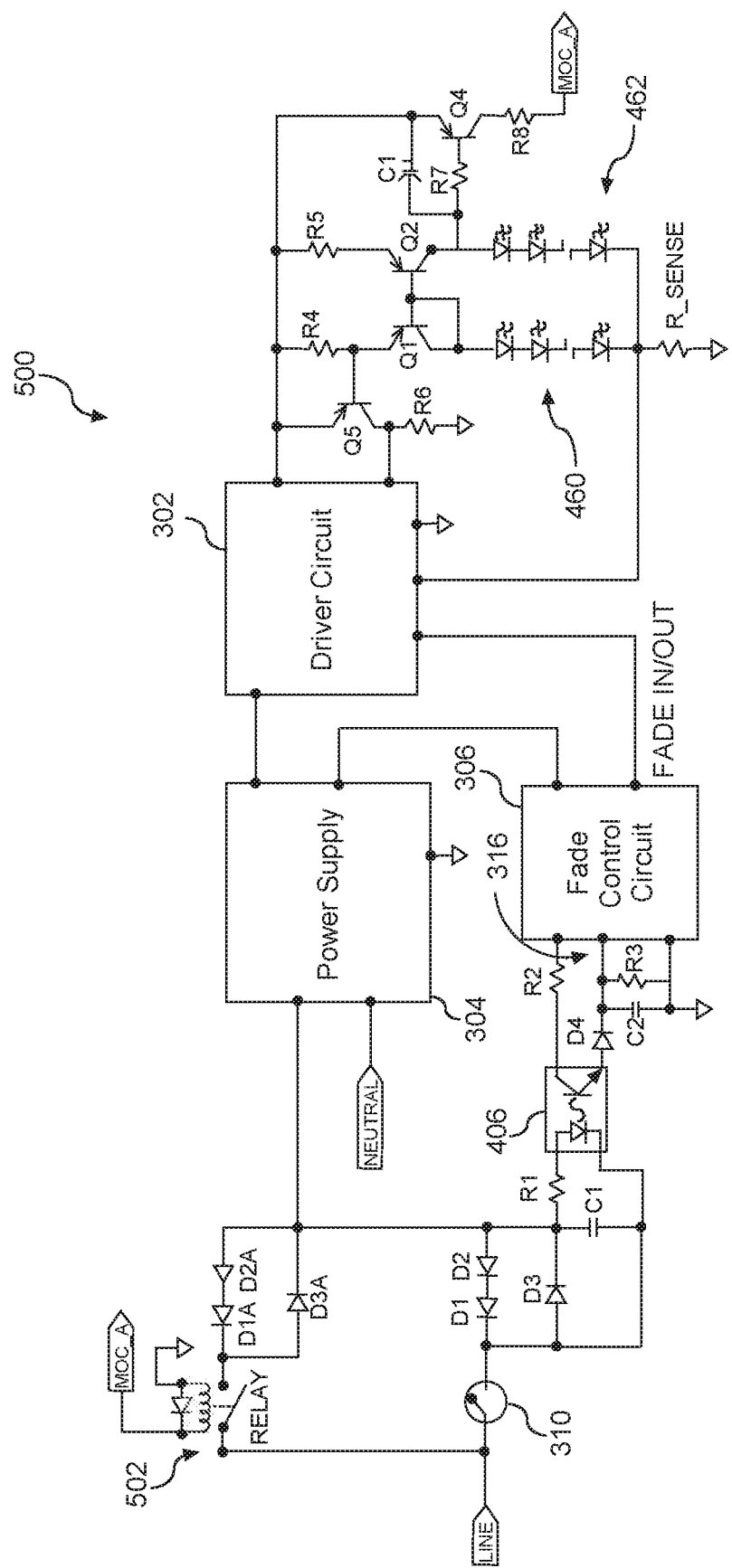
FIG. 5 illustrates a schematic of alternative circuitry for implementing the system of FIG. 3, according to example embodiments of the present disclosure.

It follows that if the main switching device 310 is again placed into the second state, the above-described fade-in operation begins again and second switching device 314 again is placed in the closed position. Accordingly, a user may repeat the illumination cycle including the fade-out operation, and upon completion of each, there will be zero standby power consumption. Turning now to FIGS. 4 and 5, detailed schematics of circuitry for implementing the system 300 are provided and described in detail.

FIG. 4 illustrates a schematic of circuitry 400 for implementing the system of FIG. 3, according to example embodiments of the present disclosure. As illustrated, driver circuit 302, power supply 304, and fade control circuit 306 remain as arranged in FIG. 3. However, additional circuitry to provide the functionality described above is illustrated in detail.

As illustrated, when main switching device 310 is placed in the second state, AC power is provided to the power supply 304 through the diode network formed by diodes D1, D2 and D3. Accordingly, the power supply 304 will energize and provide a DC voltage to fade control circuit 306 and driver circuit 302. Furthermore, as the supplied AC power by main switching device 310 is sinusoidal, the negative half period will activate optoelectronic isolation circuit 406 through the forward biasing of diodes D1 and D2. Hence, optoelectronic isolation circuit 406 is configured to transfer a signal indicative of a state (e.g., the first state or second state) of the first switching device 310 to the fade control circuit 306.

It is noted that diodes D1 and D2 are situated as one or more voltage dropping components. Hence, the forward biasing of diodes D1 and D2 creates an approximate 1.4V voltage drop. This voltage drop is enough to forward bias the optoelectronic isolation circuit 406. Subsequently, the transistor output of the optoelectronic isolation circuit 406 will energize a peak detector formed by diode D4, capacitor C2, and resistor R3, which will activate the signal 316, as described above.

Upon receipt of signal 316, the fade control circuit will generate a linear variation of the PWM duty cycle from 0% to 100% supplied to driver circuit 302. Subsequently, the driver circuit 302 will ramp-up current to the LED strings 460 and 462 until a desired level of brightness is reached. It is noted that LED brightness is regulated and kept constant through the feedback loop created by R SENSE and the driver circuit 302.

A power current mirror is formed by transistors Q1 and Q2. The power current mirror will regulate and match the brightness of two independent LED strings 460 and 462, simultaneously.

Once current is flowing through transistors Q1 and Q2 simultaneously, and with the same intensity, transistors Q4 and Q5 will be energized. Transistor Q5 is arranged as an over-current sensor which is configured to disable output current from the driver circuit 302 in the event of the disconnection of LED string 462, or another overcurrent condition.

Transistor Q4 is configured to drive optoelectronic isolation circuit 404. In operation, transistor Q4 is a transistor component in communication with the one or more LEDS comprising LED strings 460 and 462, and is configured to signal completion of the fade-out operation. For example, when current is flowing to the transistor Q2, the voltage generated by the saturation of transistor Q2 and the voltage drop across resistor R5 will eventually bias the optoelectronic isolation circuit 404 through the transistor Q4 and resistor R8. Accordingly, during a fade-in operation, fade-out operation, and during steady state operation of LED strings 460 and 462, optoelectronic isolation circuit 404 will turn on the bilateral triode thyristor (TRIAC) 402. Upon completion of a fade-out operation, optoelectronic isolation circuit 404 will turn off TRIAC 402. Hence, optoelectronic isolation circuit 404 is configured to transfer a signal indicative of completion of the fade-out operation to the second switching device or TRIAC 402.

As illustrated, since TRIAC 402 is in parallel to the main switching device 310, TRIAC 402 will latch the AC power upon closing of the main switching device 310 and powering of LED string 462. Upon opening of the main switching device 310, there will be no AC power flow through the diode network formed by diodes D1, D2, and D3 due to the voltage drop across TRIAC 402 exceeding the voltage drop across diodes D1 and D2. This is similar to the voltage dropping components 312 described above with reference to FIG. 3. However, AC power will still be supplied to the power supply 304, while optoelectronic isolation circuit 406 will be turned off.

Consequently, signal 316 will be absent, and the fade control circuit will generate a linear PWM ramp down from 100% to 0%. During the PWM ramp down, the driver circuit 302 will ramp down the current to the LED strings 460 and 462. It follows then that LED brightness will also fade out. Furthermore, as soon as the current through the LED strings 460 and 462 decreases to the minimum necessary to keep the LEDs forward biased, the current flow will stop and the voltage across transistor Q2 and resistor R5 will not be sufficient to saturate transistor Q4 to keep optoelectronic isolation device 404 energized. Thus, TRIAC 402 will turn off, severing AC power to the power supply 304 and therefore the circuit 400, thereby ensuring zero standby power.

FIG. 5 illustrates a schematic of alternative circuitry 500 for implementing the system of FIG. 3, according to example embodiments of the present disclosure. As shown, the circuit 500 is substantially similar to circuit 400. Additionally, driver circuit 302, power supply 304, and fade control circuit 306 remain as arranged in FIG. 3 and FIG. 4.

However, rather than utilizing a TRIAC as the second switching device, a relay 502 is used in series with a diode network formed of diodes D1A, D2A, and D3A. It is noted that diodes D1A and D2A are situated as one or more voltage dropping components. Hence, the diode network provides a voltage drop that exceeds the voltage drop of diodes D1 and D2, thereby ensuring that the relay 502 will be placed in the open (e.g., OFF) position upon completion of the fade-out operation as described in detail above.

Figure 6:
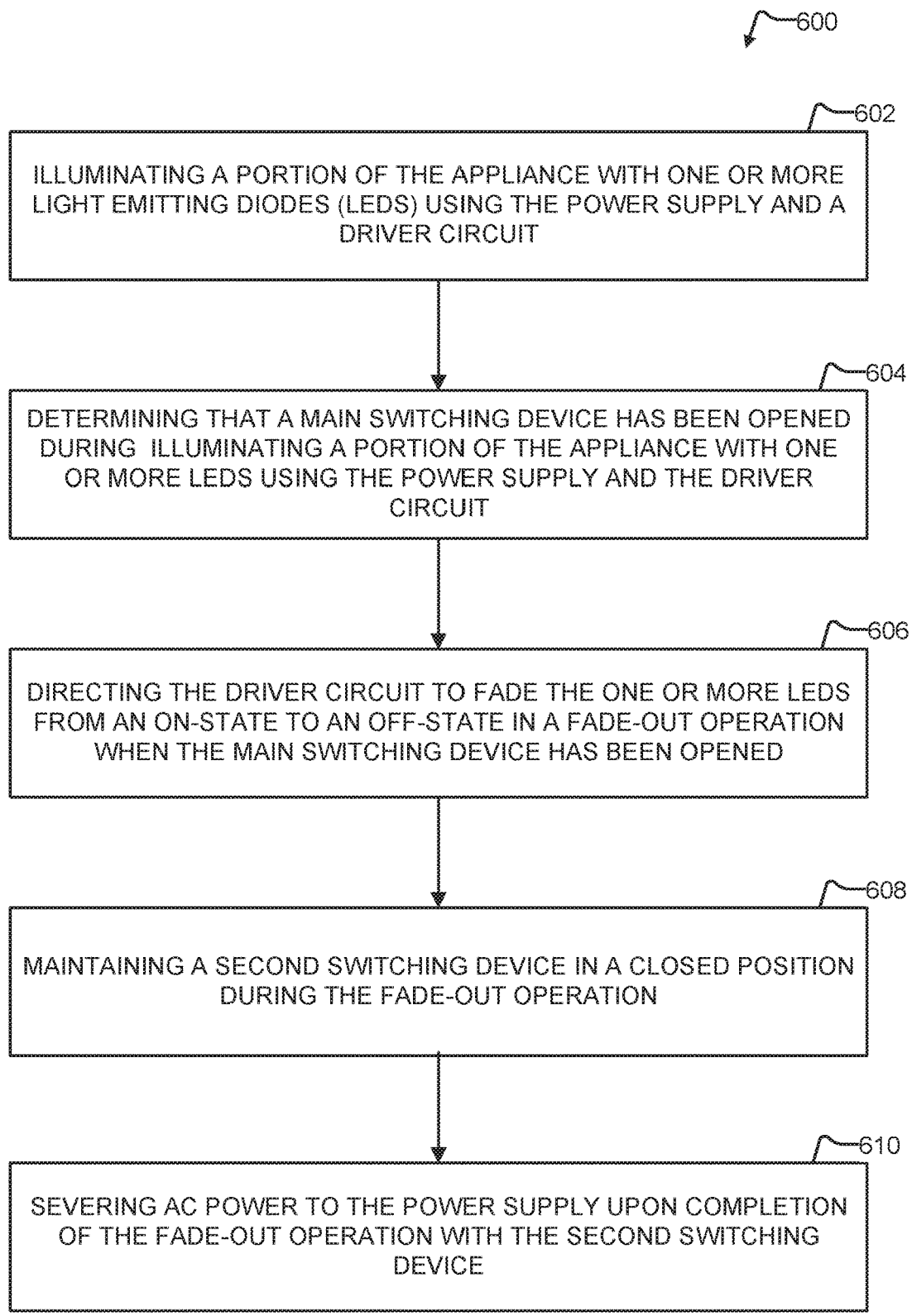
FIG. 6 is a flowchart of a method of illuminating an appliance with zero-standby power, according to example embodiments of the present disclosure.

FIG. 6 is a flowchart of a method 600 of illuminating an appliance with zero standby power, according to example embodiments of the present disclosure. As shown in FIG. 6, the method 600 includes illuminating a portion of the appliance with one or more LEDs using the power supply 304 and driver circuit 302, at block 602. For example, the illuminating may be initiated by closing the main switching device 310.

The method 600 further includes determining that the main switching device 310 has been opened during illuminating a portion of the appliance with one or more LEDs using the power supply and the driver circuit, at block 604. For example, upon opening of the main switching device 310, diode network D1, D2, and D3 may be de-energized, causing the signal 316 to cease.

The method 600 also includes directing the driver circuit to fade the one or more LEDs from an on-state to an off-state in a fade-out operation when the main switching device 310 has been opened, at block 606. As the signal 316 has ceased, the fade control circuit 306 may initiate a ramp-down of the PWM signal described above, from 100%-0%.

The method 600 further includes maintaining the second switching device 314 in a closed position during the fade-out operation, at block 608. For example, the second switching device may include the TRIAC 402 or the relay 502. During the fade-out operation, the transistor Q4 may maintain the second switching device in the on position.

The method 600 also includes severing AC power to the power supply upon completion of the fade-out operation with the second switching device, at block 610. For example, the second switching device may include the TRIAC 402 or the relay 502. Upon completion of the fade-out operation, the transistor Q4 may shut off, thereby opening the second switching device.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance, comprising:
   a power supply configured to receive Alternating Current (AC) power and supply Direct Current (DC) power;
   a driver circuit configured to receive the DC power and illuminate one or more light emitting diodes (LED);
   a fade control circuit configured to direct the driver circuit to fade the one or more LEDs from an on-state to an off-state in a fade-out operation;
   a first switching device configured to direct the fade circuit to perform a fade-out operation while the first switching device is in a first state; and
   a second switching device configured to maintain AC power to the power supply during the fade-out operation, and further configured to sever AC power to the power supply upon completion of the fade-out operation.

2. The appliance of claim 1, wherein the first switching device is a main switch configured to turn interior appliance illumination on and off.

3. The appliance of claim 1, wherein the second switching device is a bilateral triode thyristor (TRIAC).

4. The appliance of claim 1, wherein the second switching device is a relay connected in series with one or more voltage dropping components.

5. The appliance of claim 4, wherein the one or more voltage dropping components are diodes connected in series with the relay.

6. The appliance of claim 1, further comprising a transistor component in communication with the one or more LEDS, the transistor component configured to signal completion of the fade-out operation.

7. The appliance of claim 1, further comprising an optoelectronic isolation circuit configured to transfer a signal indicative of a state of the first switching device to the fade control circuit.

8. The appliance of claim 7, further comprising two or more voltage dropping components arranged between the optoelectronic isolation circuit and the first switching device.

9. The appliance of claim 8, wherein the two or more voltage dropping components ensure AC power is supplied from the first switching device while the first switching device is in a second state, and ensure the optoelectronic isolation circuit is in an off state while the first switching device is in the first state.

10. The appliance of claim 1, further comprising an optoelectronic isolation circuit configured to transfer a signal indicative of completion of the fade-out operation to the second switching device.

11. The appliance of claim 1, wherein the fade control circuit is further configured to direct the driver circuit to fade the one or more LEDs from an off-state to an on-state in a fade-in operation.

12. The appliance of claim 11, wherein the first switching device is further configured to direct the fade control circuit to perform the fade-in operation while the first switching device is an a second state.

13. A method of illuminating a portion of an appliance with zero standby power use by a power supply, the method comprising:
   illuminating a portion of the appliance with one or more light emitting diodes (LEDs) using the power supply and a driver circuit;
   determining that a main switching device has been opened during illuminating a portion of the appliance with one or more LEDs using the power supply and the driver circuit;
   directing the driver circuit to fade the one or more LEDs from an on-state to an off-state in a fade-out operation when the main switching device has been opened;
   maintaining a second switching device in a closed position during the fade-out operation; and
   severing AC power to the power supply upon completion of the fade-out operation with the second switching device.

14. The method of claim 13, further comprising directing the driver circuit to fade the one or more LEDs from an off-state to an on-state in a fade-in operation.

15. The method of claim 14, wherein the fade-in operation is performed responsive to a first switching device being closed.

16. The method of claim 13, wherein the second switching device is a bilateral triode thyristor (TRIAC).

17. The method of claim 13, wherein the second switching device is a relay connected in series with one or more voltage dropping components.

18. The method of claim 13, wherein a transistor component is configured to signal completion of the fade-out operation.

19. The method of claim 13, further comprising transferring a signal indicative of a state of a first switching device to fade control circuit using an optoelectronic isolation circuit.

20. The method of claim 13, further comprising transferring a signal indicative of completion of the fade-out operation to the second switching device using an optoelectronic isolation circuit.

* * * * *